J. F. PIEHL.

School-Desks.

No. 5,199. Reissued Dec. 24, 1872.

Witnesses
Nelson A. Smith
A. N. Newton

Inventor
John F. Piehl
By F. B. Hunt
Attorney

AM. PHOTO-LITHOGRAPHIC CO. N.Y. (OSBORNE'S PROCESS.)

UNITED STATES PATENT OFFICE.

JOHN F. PIEHL, OF RICHMOND, INDIANA.

IMPROVEMENT IN SCHOOL-DESKS.

Specification forming part of Letters Patent No. 106,403, dated August 16, 1870; reissue No. 5,199, dated December 24, 1872.

*To all whom it may concern:*

Be it known that I, JOHN F. PIEHL, of Richmond, county of Wayne and State of Indiana, have invented certain Improvements in School-Desks, of which the following is a specification:

My invention relates to an improvement in folding-seats for school-desks, wherein I use a clamp for holding the vibrating or folding arm to which the seat is attached in such manner as to create friction in the joint upon which the seat-arm turns, said clamp being held in position by a bolt passing through it at a point between the joint and the opposite end of the clamp, thereby creating constant friction on the joint without danger of loosening the bolt which holds the clamp in position.

Figure 1:
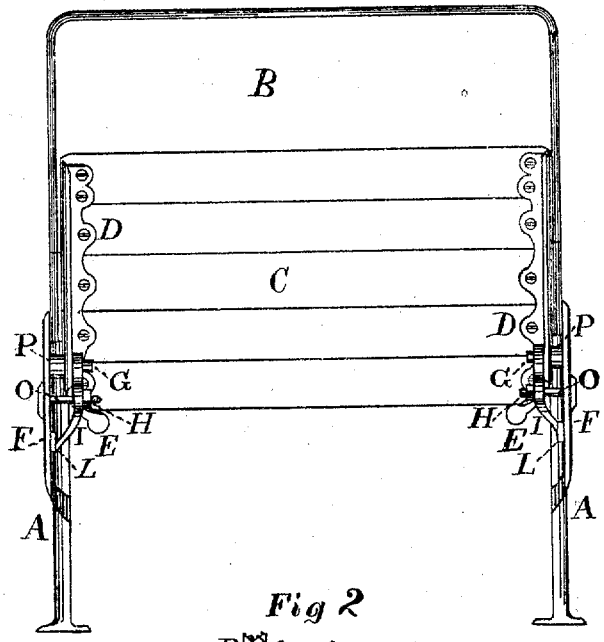
Figure 2:
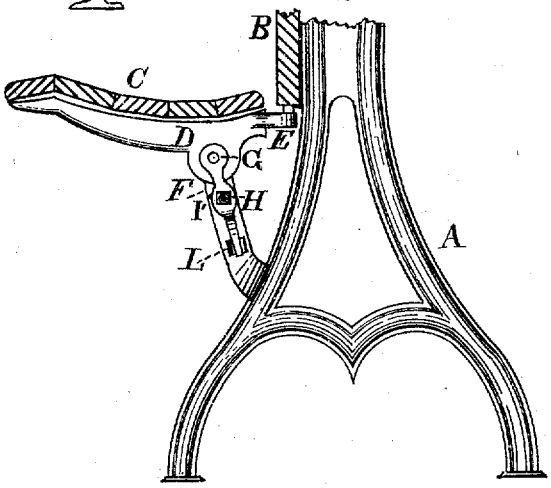

Figure 1 is a front elevation with the folding-seat turned up to show the joint and the operation of the same. Fig. 2 is a side elevation with an end view of the seat as seen when turned down.

A A are the legs or uprights, to which the wood-work is attached; B, the back-board; and C, the seat. D is the seat-arm, to which the seat is attached, said arm having a lug, E, at its rear end, which falls back under the bottom of the back-board when the seat is turned down. P is a lug attached to the arm F. The axle G (upon which the seat-arm turns) proceeds from the center of the lug P. The seat-arm slips over the axle G and against the lug P. The clamp I is then placed on the axle G outside the seat-arm, the lower end of the clamp I falling into a recess in the lug L, which holds the lower end in place. I then insert the bolt O through the arm F and clamp I, between the axle G and lug L, which holds the upper end of the clamp I firmly against the seat-arm, and, pressing it against the lug P on arm F, thus forming a friction-joint which is always noiseless and not liable to get out of order, as when the bolt passes through the joint. The axle G may be made slightly tapering, and the hole in the seat-arm made to fit it snugly. The clamp I holding it firmly against the taper will avoid all possibility of looseness in the joint and avoid all noise. H is a nut on the inner end of the bolt O which holds the clamp I in place, said clamp resting against the seat-arm at its upper end, and the lower end of said clamp resting against the arm F and standing outward from the arm F at the point through which the bolt O passes, in order to give the clamp spring or elasticity, which will follow up or compensate for any wear of the seat-arm or clamp, thereby making a joint that is always tight and noiseless at any stage of wear of the joint.

I am aware of the patent of A. E. Roberts, dated January 11, 1870, and D. H. Nation, dated May 18, 1869. I do not claim the combinations therein contained; but

What I claim, and desire to secure by Letters Patent, is—

In combination with the standard A and seat-arm D, the clamp I having the bearing at its upper end on the seat-arm D, and at its lower end in the notch in lug L, and secured to the arm F of the standard A by the bolt O, and standing out from said arm F where the bolt O passes through, all constructed substantially as and for the purpose described.

JOHN F. $\overset{\text{his}}{+}$ PIEHL.
mark.

Witnesses:
NELSON A. HUNT,
ORLANDO B. HUNT.